Sept. 6, 1966   J. C. C. GANDIER   3,270,714
SYSTEM FOR COLLECTING URINE FROM PREGNANT MARES
Filed March 2, 1965   2 Sheets-Sheet 1

INVENTOR.
JOHN C.C. GANDIER
BY
Edmund H O'Brien
ATTORNEY

Sept. 6, 1966  J. C. C. GANDIER  3,270,714
SYSTEM FOR COLLECTING URINE FROM PREGNANT MARES
Filed March 2, 1965  2 Sheets-Sheet 2
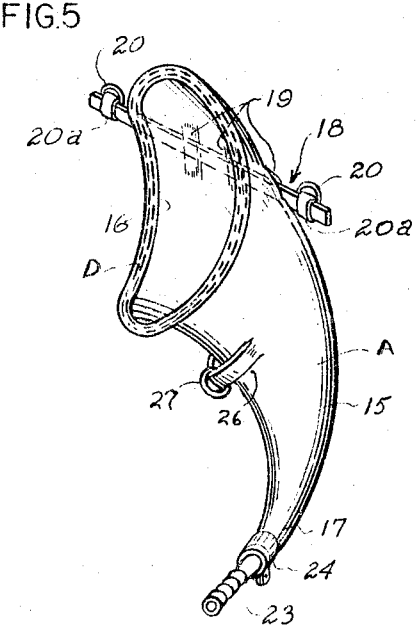
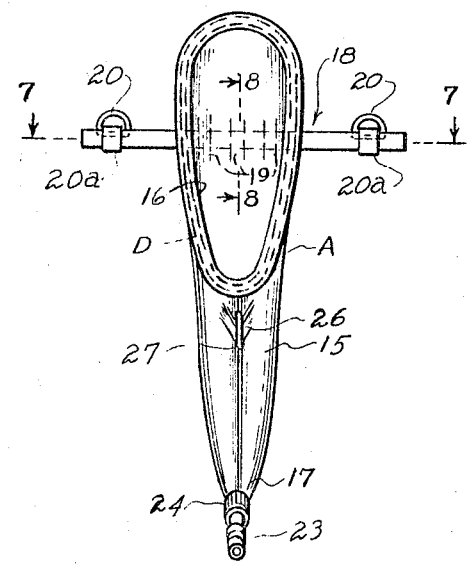
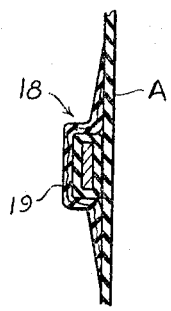
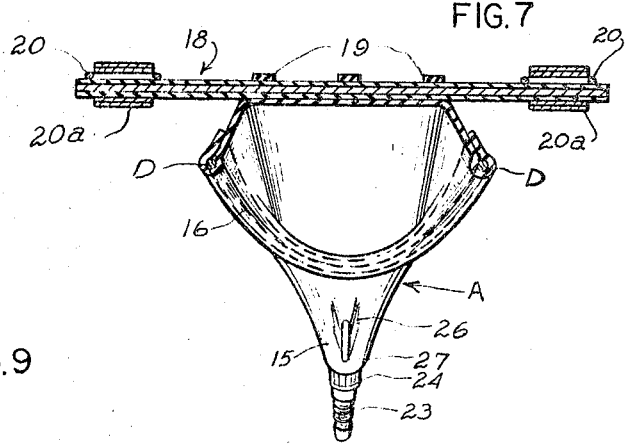
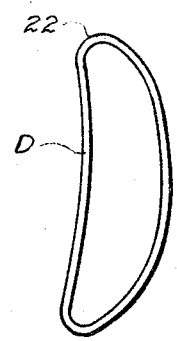
INVENTOR.
JOHN C.C. GANDIER
BY Edmund H O'Brien
ATTORNEY 3,270,714
SYSTEM FOR COLLECTING URINE FROM
PREGNANT MARES
John C. C. Gandier, Dorval, Quebec, Canada, assignor to
American Home Products Corporation, New York,
N.Y., a corporation of Delaware
Filed Mar. 2, 1965, Ser. No. 436,594
4 Claims. (Cl. 119—95)

This invention relates to means for collecting urine from certain quadrupeds.

The collection of urine from pregnant mares became commercially important with the discovery that it contained a powerful oestrogenic factor. In the early days, the means of collection was relatively crude and took the form of a "bucket brigade." This method was inefficient because of uncontrollable wastage and spillage.

It was at this stage that a receptacle which could be suitably suspended from the mare was devised, which differed from prior animal-suspended receptacles in that the urine could be collected substantially free from feces. Harness was also devised which would, without fail, keep the receptacle in place at all times without unduly annoying the animal. With this relatively effective collecting means, the art has been quite well satisfied and an extremely large farm business has been developed.

Through the years, various improvements have been made on the receptacle itself and on the harness. Yet, problems which still prevailed after two decades, were the regular day and night emptying which could not be be avoided and the fact that the urine stayed in the receptacle in close body contact for some time after being voided. The heat of body contact tended to cause chemical reaction and deteriorate the active substance. Further, this repeated disturbance of the animal for the purpose of emptying the receptacle interfered with the animal's comfort and imposed physical stress, leading to excitement, bad nature and pain from harness cuts. Loss of urine by spilling, and kicking, were encountered quite frequently. This also made it dangerous for the operator, so labor remained a big problem. Moreover, the potential production life of the mare was lowered.

The present invention represents a major break-through in this art which makes it possible to avoid the disadvantages of the manual bag collection method mentioned above. Briefly, according to the invention, the urine, as voided, is received by an attachment which is appropriately fitted to the animal and insofar as receiving the urine is concerned fulfills the known functions of the collecting bag. However, unlike previous methods a collecting bag proper is not employed, but merely a conducting vessel which serves to channel the urine away from the animal as it is voided. The conducting vessel has a delivery end connected to a flexible conduit which leads to a remote receptacle. Preferably, the collecting vessel extends forwardly between the animal's hind legs and the conduit leads from beneath the animal to one side, to a fixed support and thence downwardly to the collecting vessel so that the urine may flow by gravity. Desirably, the individual conduit for each animal leads to a common conduit receiving also urine from other animals. The common conduit leads in a downward direction to the ultimate receptacle. The conduits leading from the individual animals are preferably made of a very elastic rubber or other elastic material so as to allow stretching within a certain tolerance as the animal moves, halter-tied in the stall, or as it lies down.

The cleaner, less laborious and more efficient, method of collecting the urine of pregnant mares, as herein disclosed, as that urine is voided from each animal, followed by the quick transference thereof to a central collecting vessel, together with the improved apparatus therefor, as herein described, has freed the collection of urine, by farmers, from the social and economic stigmas and disadvantages which previously were connected with this operation in the eyes of the farming community.

Since the urine, when voided, in my improved system, flows immediately to a transverse conduit, from whence it flows to a collection receptacle, both of these being located outside of the barn in which the animals are housed, there is no accumulation of any vile-smelling urine within the barn itself. No odor of urine therefore remains within the stables. The provision of external means for the transmission and collection of urine, especially the urine from a number of animals, which, in accordance with my improved system, may be in a single collection vessel positioned some distance away from the stable housing the animals and the dwelling house of the farmer, has resulted in more and more farmers becoming interested in supplying this source of valuable medical products. Since the social opprobrium previously associated with the business has been substantially removed by my invention, the disadvantages previously attendant its collection having substantially disappeared, greater supplies of pregnant mares' urine have become available and new territories of urine collection have been opened up by my invention.

In the manner described, the urine as voided is quickly led away from each animal and from the deleterious influence of its body heat to a central collecting site where the urine from a plurality of animals is collected automatically, and where it is immediately cooled and contacted with a suitable preservative. As a consequence of the above features, degradation of the estrogenically active principles contained in the urine is minimized, resulting in a substantial increase in recoverable estrogenic potency. This is an important advantage over existing methods of collection.

All of the urine-collecting devices previously available rely upon the collections of a substantial amount of urine in a bag attached in some way to the mare. As a consequence of the proximity of the voided urine to the animal, the urine is kept at a temperature close to body temperature and is subject to a greatly accelerated rate of deterioration. It is a particular advantage of this invention that the urine is not held close to the animal, but that it is immediately drained away to a storage container where it is rapidly cooled and mixed with preservative. The collecting device of this invention does not have the function of a collection bag in which the urinary output of a certain period of time is stored temporarily, but it has changed in function to that of a funnel designed to catch the voided urine and to drain it away from the animal immediately.

This apparatus as herein disclosed avoids the necessity of disturbing the animal for emptying any receptacle, and it has been found that, in practice, the conducting vessel can be worn by the animal continuously for protracted periods of time in a most humane manner.

Having thus generally described the invention, it will be referred to in more detail by reference to the accompanying drawings in which FIGURE 1 is a side elevation partly in section showing a mare tethered in a collecting stall equipped according to the invention and carrying the collecting equipment of the invention.

FIGURE 5 is a front perspective view of the collecting receptacle forming a part of the collecting apparatus of the invention on a greatly enlarged scale.

FIGURE 6 is a front elevation of a receptable according to the invention on the scale of FIGURE 4.

FIGURE 7 is a horizontal cross-section along the line 7—7 of FIGURE 6 on a still further enlarged scale.

FIGURE 8 is a fragmentary cross-section on a still further enlarged scale along the line 8—8 of FIGURE 6.

FIGURE 9 is a perspective view of a stiffener ring forming a part of the receptacle of the previous figures.

Figure 1:
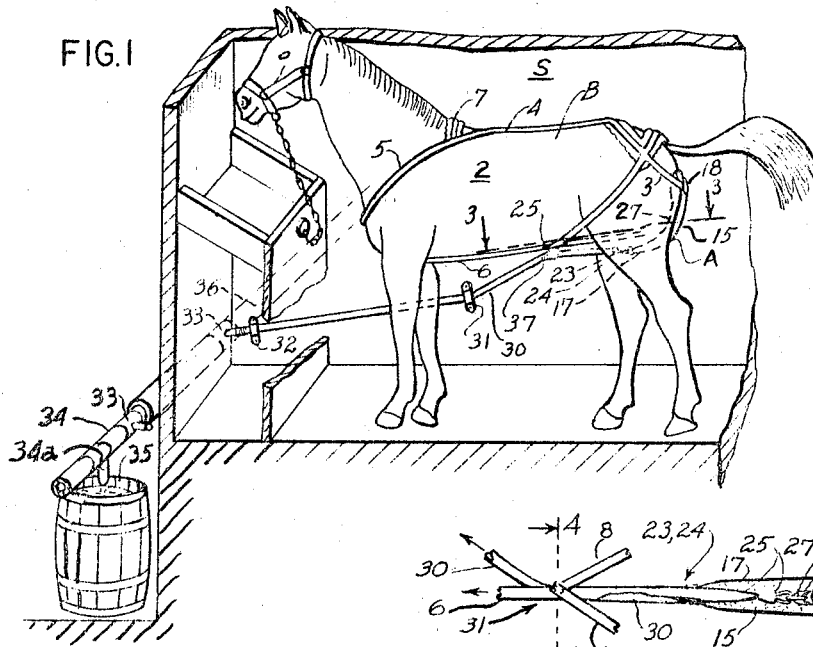

Referring more particularly to the drawings, a collecting vessel, or receptacle, A is shown by way of example, mounted on a mare B by means of a light harness C similar in principle to that disclosed in Canadian Patent 559,568, Gandier, July 1, 1958. The harness C is made up as follows. Two croup straps 3, each attached at one end of the receptacle A, are joined at the other end to a backstrap 4. The details of the receptacle and the means of connection to the harness will be described later. The front end of strap 4 is joined to two breast straps 5 which pass on either side of the mare's neck and are joined together in an attachment to belly strap 6. The latter passes under the mare's belly and between the hind legs, where its rear end is secured to the connecting ring 27. A yoke strap 7, secured at each end to breast straps 5, prevents undue sideways displacement of the latter, and a diagonal yoke strap 8 passes diagonally over and on both sides of the mare's hindquarters, where it is attached to both croup straps 3, and its ends meet and are attached to the belly strap 6. Yoke strap 8 prevents sideways displacement of the hind portion of the harness and of the receptacle A. This equipment is readily adaptable to collection of urine from a male quadruped.

In this invention, the receptacle A is a conducting funnel leading to a remote vessel or manifold. The latter type is shown by way of example. The receptacle A shown is made up of a body portion 15 having a mouth indicated generally as 16 and a narrowed delivery end terminating in a tubular portion 17. The body 15 is made of a flexible fabric for example of an elastomeric material like rubber, synthetic rubber, or plastic. A heavy stiffener is incorporated in the mouth of the body 15, so as to make the mouth shape-retaining, i.e., it is not limp but stiff enough when formed as shown to resist buckling. A harness connecting bracket 18 is secured across the back of the body. The preferred connecting means shown are a series of loops 19 through which the bracket 18 is threaded. This arrangement is particularly advantageous as it permits shifting of the harness to be compensated for by lateral movement of the bracket relative to the receptacle body 15, so that the alignment of the mouth 16 is not disturbed. A less desirable construction is to mount the bracket immovably on the body of the receptacle by bolts, rivets or other means. The bracket 18 has a central part secured to the body 15 and laterally extending straight parts which carry near their ends harness receiving rings 20. Preferably, the bracket 18 is made of malleable metal encased in elastomeric material.

The bracket 18 is of metal or plastic, soft enough to be bent into shape, and yet stiff enough to retain its shape once it has been bent into the desired form. This bracket 18 is preferably metal having a rubber or other elastomeric or plastic covering and secured to the body 15 of the receptacle A. In a typical construction, it is attached to the body 15 of the receptacle A approximately two inches to three inches below the upper end. The exact location of attachment is chosen in such a way that the complete assembly, when suspended by the two extremities of the bracket 18, and allowed to swing freely, is balanced in such a way that the mouth of the collecting bag 15 is in a substantially vertical position when used on a female quadruped. This is important to ensure constant forward pull upon the assembly, to maintain snug contact between the mouth of the collecting bag 15 and the skin of the animal surrounding the external genitals.

With further reference to the suspension of the receptacle from the animal, it should be mentioned that while a typical distance of between two and three inches as the distance between the bracket 18 and the top of the mouth of the receptacle, this can vary depending on the size of the receptacle on other factors. The point at which the bracket is attached to the receptacle is governed as follows. In the case of a mare, it must be attached at such a point to keep the mouth of the receptacle in vertical posiiton when suspended by the bracket 18 and freely movable. This can be referred to as its "point of balance." In the case of a male quadruped similar principles apply.

The "point of balance" attachment of the bracket is an important advance over prior practice of attaching a urine collecting bag to the harness by means of steel rings directly vulcanized onto the body of a collecting bag. When the bracket 18 is attached to the receptacle at the "point of balance" any pull exerted on the bracket by the croup straps 3 will tend to move the upper end of the mouth against the animal's body and will ensure sealing between the mouth of the receptacle and the body to prevent entry of feces.

The bracket 18 is bent in a rearward direction so as to remain clear of the buttocks of the mare. In a preferred construction, the bracket 18 is provided with rings 20 to which the harness straps may be secured. These may be metal rings which can be attached by sleeves 20a of rubber as shown. Alternatively, the ends of this batten may be perforated or slotted and the croup straps 3 threaded through the perforations or slots, or attached thereto by hooks, snaps, or the like.

By this construction, the pull exerted upon the bracket 18 by the harness straps, forces the receptacle A in a forward direction and brings its mouth 16 into close contact with the skin of the animal surrounding the external genitals, in the case shown the perineal region of a mare.

The front of the receptacle, approximately two to three inches below the lower end of its mouth 16, carries a steel ring 27 (for example one and one-half inch diameter). This ring 27 is attached to the body of the receptacle by means of a rubber strap vulcanized to the body.

In accordance with the invention, the mouth 16 is constructed by rolling the margin of the body 15 back on itself to encase a metal ring D and sewing or otherwise connecting the free margin thereof to the part of the body to which it is juxtaposed, enclosing the ring D within the resulting sleeve.

Figure 3:
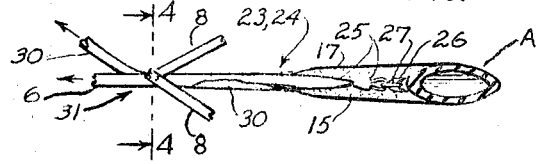
FIGURE 3 is an enlarged fragmentary cross-section along the line 3—3 of FIGURE 1.
Figure 4:
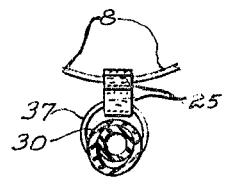
FIGURE 4 is a cross-sectional view along the line 4—4 of FIGURE 3.

The ring D is preferably a metal ring which is sufficiently rigid to retain its shape under normal conditions of use and to keep the mouth 16 of the receptacle A in the substantially fish-mouth shape shown in FIGURE 3, but sufficiently malleable so that it can be bent locally and thus reshaped to fit an individual animal in an exact manner, it being well known that there is considerable variation in size and shape of the genital area from animal to animal. The ring is of the overall shape shown in FIGURE 9 and may be formed of a single piece of wire the free ends of which are welded to form a joint 22. The wire loop D may be padded, for example by encasing it in a soft material, as for instance, rubber, so as to make the resulting lip or bead more pronounced and to improve its capacity for seating against the tissue of the animal without irritation. This padding can be effected by providing a multiple roll of the material of the body 15 about the ring D as the latter is being applied to the mouth of the body 15.

The ring D can be made, for example, of number 9 cold drawn steel wire commonly known as "fence support wire." Of course, the invention is not limited to using this specific wire. Any wire may be used which is malleable enough to be bent into shape but rigid enough to hold its shape during normal conditions of use, once it has been bent to the desired shape.

The body 15 is desirably made of fairly soft rubber and the upper end of the tube is stitched around the ring D in somewhat the same manner as in a purse, or ring D is integrally moulded into the body 15. This combination is adapted to provide a snug fit between the receptacle and the skin of the animal surrounding the external genitals and excluding the anus.

The croup straps 3 are connected to the respective rings 20 so as to retain the mouth 16 of the receptacle against the skin of the animal surrounding the external genitals. The tubular lower end 17 is connected to an adapting sleeve 23 which is held within the end by a collar clamp 24 as shown in FIGURE 5. The end 17 is connected to the belly strap 6 by a connecting strap 25 so as to suspend the lower end of the receptacle A in a suitable position with respect to the mare's body. Connected to the upper front part of the body 15, for example by a rubber loop 26 vulcanized to the body, is a connecting ring 27. The ring 27 is in turn connected to the belly strap 6 so as to draw the intermediate part of the body 15 in a forward and downward direction, thus ensuring a snug fit between the mouth of the collecting tube at its lower portion and the skin of the animal surrounding the external genitals.

The invention has thus far been described by way of example, as applied to collecting urine from a mare. The same device can be used equally as effectively for collecting from a stallion or from a male quadruped. In this event, the lip or collar of the bag will encompass the sheath of the penis, then the bracket 18 is attached to the loin straps which extend upward about the loins and connected to the back strap. The loin strap will also be attached to the diagonal yoke straps. There will also be an attachment between the ring 27 and the loin straps at intermediate points. The form of the lip 16 may have to be changed to some extent, over the specific form shown, depending on the exact conformation of the animal on which it is to be used.

Distributing system

The present invention relates to a distribution system by which the urine received by the receptacle 15 is distributed to a remote collecting vessel. To this end, the connector 23 receives the end of a resilient and flexible or pliable tube 30. This tube extends from the connector 23 sideways and downwards through a ring 31 mounted on the wall of the stall 3, thence downwards through a ring 32 also on the wall of the stall 3 and ultimately to a T connection 33 connected to a pipe 34 extending downwardly from right to left as shown to join a union 34a emptying into a container 35. A pipe 36 is shown coming in a downward direction from another stall to meet the union 34a.

In operation, the urine voided into the receptacle A passes down through the tube 30, into the pipe 34 and thence to the receptacle 35.

Figure 2:
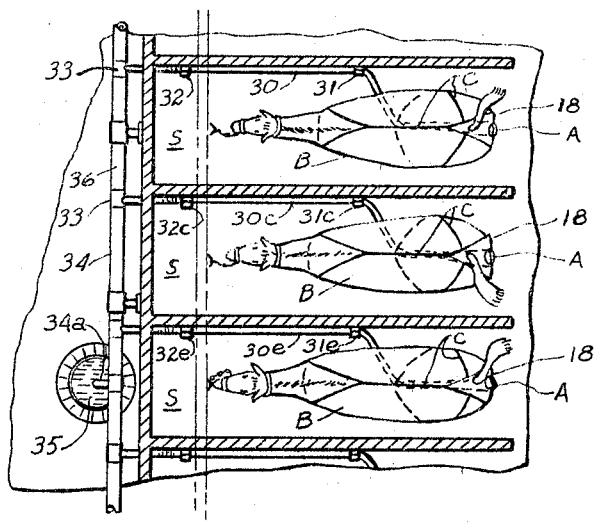
FIGURE 2 is a top plan view partly in section showing a number of mares tethered in respective collecting stalls being equipped according to the invention.

FIGURE 2 shows several mares tethered in adjoining stalls and equipped in the same manner as above described so that the urine flows through flexible tubes 30, 30c and 30e into the common pipe and thence into the receptacle 35.

To ensure that this collecting system will work effectively there are certain characteristics which the apparatus must have. The tubes 30, 30c and 30e must be made of elastic material so that they can stretch and return to their original positions when the halter-tied animal moves in the stall.

The collection tube 30 is attached to the collection harness by the hose being pulled over the ribbed adapter sleeve 23 and being taped on the outside to secure it to this sleeve. The sleeve is securely held to the tubular end 17 of the receptacle body 15 by the clamp 24. The flexible and elastic tube 30 is led in a forward direction through to a guide member 37 attached to the junction of the belly strap 6 and the loin straps 8, to which guide member the flexible elastic tube A is fixedly secured. Thus, any pull exerted on the elastic collection hose 30 is taken up by the harness and not by the adapter 23 which connects the collection hose 30 to the receptacle A. A suitable adapter is plastic garden hose adapter of one-half inch inside diameter. This adapter may be adhesively secured and/or vulcanized to the delivery end of the collection receptacle A, as well as being clamped to it.

The connection between the hose 30 and the trunk line 34 may be a standard plastic T, commonly used for connecting plastic water tubing. In a typical installation the cross-bar of the T would be for one inch tubing and the stem would take the elastic collection hose end be of a size suitable for one-half inch inside diameter tubing.

In order to prevent kinking or sagging, the animal is hitched in such a fashion that when in the closest position to the head of the stall there will be no kinking and substantially no sagging of the elastic tube. If the animal is tethered in this position, the stretchability of the elastic tubing will allow it to move freely within the confines of the stall, making the system fully functional. In a typical installation the animal is tethered in such a way as to allow approximately four feet of free movement in the stall. Quadrupeds, e.g., mares and stallions do not lie down frequently, but some of them lie down occasionally, but always stand up to urinate. Lying down does not affect the harness or the flexible tube.

In a preferred embodiment of the invention, the adapter 23 is arranged to lie between the hind legs. From there the tube 30 is led through a steel ring 37 attached to the harness. The point of attachment of the steel ring 37 on the inside of the stall is chosen in such a way that it is approximately one-half way between the hind and front legs of the mare. With this arrangement, the hind legs of the mare cannot disturb the tube 30 should the mare feel like scratching. Also, when the mare lies down, the tube 30 cannot be kinked or pulled out of position.

The above invention has an important advantage over the older systems of collection, as follows: When using a urine collection bag as was used in all former systems, and if the animal were to lie down, shift position or kick while there was urine in the bags, most of the urine would be spilt and lost. In the present system, the "bag" has been reduced to a "collection funnel" which is never filled to any extent because it drains its contents immediately. Thus, no urine can be lost when the animal lies down. Members of the equine family do not urinate while lying down. They get up to urinate, and in that position the present invention allows for immediate draining of the urine. In this manner, substantial savings of urine may be achieved, resulting in substantially higher volumes collected per mare than were possible with existing methods of collection.

The urine collecting bag of this invention may be worn without discomfort for weeks on end. However, in actual practice it is taken off the animal once a week. Without disconnecting it from the flexible tube 30 it is placed on a hook on the side of the stall, and flushed with water. Dilute hydrochloric acid is pumped through the whole system until the level of the acid reaches the lower end of the orifice of the collecting bag. The inside of the bag is cleaned with a brush, the acid is drained to waste, and the whole system flushed with water. The collecting bag is then put back on the mare. It does not require lubrication or disinfection when treated in the manner described above.

A further advantage is that the apparatus of the invention causes considerably less discomfort to the mare than that in older systems. In those systems where the urine was retained in a collecting bag mounted on a mare, the load on the mare's hind quarters became quite heavy when the bag was full. With the present arrangement, an animal does not have to carry more than the weight of the empty bag, because any urine voided into the bag is drained away immediately.

Additional advantages of this invention over methods of prior art are as follows:

The fact that the urine collection device of this invention is more comfortable for the mares makes the animals much less nervous, excitable, and bad-tempered than when wearing the older type of collection bags. Moreover, it is well known that horses do not like to be approached from the rear, and often respond by kicking. As the urine take-off of this invention is led in a direction forward and to the side of the animal rather than to the rear as in older devices, most of the servicing and supervision of the device may be done from the side and front rather than from the rear, and this fact, together with the better temper of the animals, minimizes the danger to the operators.

Furthermore, in using collection devices of the older type which had to be emptied manually at least four times a day, it was inevitable that some urine was spilt over the hands of the operators when emptying urine collection bags. This constituted a serious hazard to the health of the workers, predominantly males, in view of the high estrogen content of the urine. Moreover, the hands of the operators became sore and malodorous from constant contact with urine, commonly causing a social stigma to be attached to this occupation which made it difficult to retain help for this kind of work. No such problems are encountered with the new and improved device of this invention.

I claim:

1. An apparatus for automatically collecting feces-free urine from a plurality of female quadrupeds which comprises a conducting receptacle mounted on each quadruped, said receptacle having a body including a receiving mouth and a delivery end remote therefrom, means for retaining said receptacle in collecting position on the quadruped, a flexible and elastic pipe connected to said delivery end thereof, a fixture to one side of the place normally occupied by the quadruped to guide said pipe in a downward direction therefrom, a common pipe leading in a downward direction to a common receptacle, and a connection between said flexible and elastic pipe and the common pipe.

2. An apparatus for automatically collecting feces-free urine from quadrupeds which comprises a receptacle mounted on a quadruped and having a receiving mouth for positioning to receive urine to the exclusion of feces and an open delivery and below said mouth, means for retaining said receptacle in place on the quadruped, a vessel for receiving urine located at a point remote from the place normally occupied by the quadruped, conduit means extending downwardly from said receptacle to said vessel including flexible and elastic hose means connected to said receptacle and extending a forward direction to a connection remote from said place, whereby inherent elasticity allows for movements of the animal while maintaining said conduit means operative.

3. An apparatus for automatically collecting feces-free urine which comprises, in combination with a stall in which a quadruped is tethered, a receptacle mountable on a quadruped and having an elongated body including a receiving mouth having a lip adapted to bear against the skin surrounding the external genitals of the quadruped to receive urine to the exclusion of feces and a tapered portion leading downwardly and forwardly to a delivery and having an opening, means for retaining said receptacle in place on the quadruped so that the tapered part of the body extends forward between the legs of the animal and is suspended from its belly, a hose adapter connected to the delivery end, a guide member on the harness to which the tube is fixedly secured; a fixedly positioned guide member located abreast of the place normally occupied by the quadruped and below the normal position of its midbody, a collecting vessel out of reach of said place and below said guide member, conduit means extending from said adapter to said vessel including an elastic and flexible tube connected to said adapter and extending through said guide means and of a length sufficient to allow for movements of the quadruped, and means for tethering the quadruped to limit its movements in the fore and aft direction.

4. An apparatus, as defined in claim 3, in which said guide means is mounted in the fore and aft direction between the front and rear legs of the quadruped, whereby the tube extends laterally from beneath the belly of the quadruped so as to be clear of its legs.

References Cited by the Examiner

UNITED STATES PATENTS

| 398,379 | 1/1889 | Cole | 119—95 |
| 474,559 | 5/1892 | Kellogg | 119—95 |
| 489,309 | 1/1893 | Jefferys | 119—95 |
| 3,036,553 | 5/1962 | Gandier | 119—95 |
| 3,177,484 | 4/1965 | Rubricius | 119—17 |

FOREIGN PATENTS 101,087  1/1899  Germany.

SAMUEL KOREN, *Primary Examiner.*

A. F. MEDBERY, *Examiner.*